(12) United States Patent
Wu et al.

(10) Patent No.: US 11,763,167 B2
(45) Date of Patent: Sep. 19, 2023

(54) COPY AREA IDENTIFICATION METHOD AND DEVICE

(71) Applicants: BEIJING JINGDONG SHANGKE INFORMATION TECHNOLOGY CO, LTD., Beijing (CN); BEIJING JINGDONG CENTURY TRADING CO., LTD., Beijing (CN)

(72) Inventors: Lixin Wu, Beijing (CN); Jingjing Lyu, Beijing (CN); Yongjun Bao, Beijing (CN); Xiaodong Chen, Beijing (CN)

(73) Assignees: BEJING JINGDONG SHANGKE INFORMATION TECHNOLOGY CO, LTD., Beijing (CN); BEIJING JINGDONG CENTURY TRADING CO., LTD., Beijing (CN)

(*) Notice: Subject to any disclaimer, the term of this patent is extended or adjusted under 35 U.S.C. 154(b) by 331 days.

(21) Appl. No.: 17/155,168

(22) Filed: Jan. 22, 2021

(65) Prior Publication Data
US 2021/0142513 A1 May 13, 2021

Related U.S. Application Data

(63) Continuation of application No. PCT/CN2019/098414, filed on Jul. 30, 2019.

(30) Foreign Application Priority Data
Aug. 1, 2018 (CN) .......................... 201810861942.7

(51) Int. Cl.
G06N 3/088 (2023.01)
G06T 7/73 (2017.01)
(Continued)

(52) U.S. Cl.
CPC ........... *G06N 3/088* (2013.01); *G06F 18/253* (2023.01); *G06N 3/04* (2013.01); *G06N 3/08* (2013.01);
(Continued)

(58) Field of Classification Search
CPC G06N 3/088; G06N 3/04; G06N 3/08; G06N 3/045; G06N 3/044; G06F 18/253;
(Continued)

(56) References Cited

U.S. PATENT DOCUMENTS

| 10,248,664 B1* | 4/2019 | Shen ....................... G06N 3/084 |
| 2003/0012438 A1* | 1/2003 | Krtolica ............... G06V 30/414 |
| | | 382/173 |

(Continued)

FOREIGN PATENT DOCUMENTS

| CN | 103002288 A | 3/2013 |
| CN | 103686181 A | 3/2014 |

(Continued)

OTHER PUBLICATIONS

Liu, X., et al., "Detection identification and detection identification network training methods and apparatuses, device and Medium", machine translation of CN108229303A, published Jun. 29, 2018.*

(Continued)

*Primary Examiner* — Xuemei G Chen
(74) *Attorney, Agent, or Firm* — Oblon, McClelland, Maier & Neustadt, L.L.P.

(57) ABSTRACT

The present disclosure provides a copy area identification method and device, which relates to the technical field of image processing. A copy area identification method according to the present disclosure includes: extracting feature information of multiple layers from an image to be processed; encoding the feature of the multiple layers information respectively, and jointly decoding according to encoded
(Continued)

information of the multiple layers to acquire a jointly decoded output; acquiring information of pixels according to the jointly decoded output, wherein the information of the pixels comprises rotation angle information of the copy area, and a distance between each of the pixels and a border of the copy area; and determining a position of a border of the copy area according to the information of the pixels.

15 Claims, 9 Drawing Sheets

(51) Int. Cl.
| | |
|---|---|
| *G06N 3/04* | (2023.01) |
| *G06N 3/08* | (2023.01) |
| *G06T 7/00* | (2017.01) |
| *G06F 18/25* | (2023.01) |
| *G06V 10/25* | (2022.01) |
| *G06V 30/19* | (2022.01) |
| *G06V 10/82* | (2022.01) |
| *G06V 10/84* | (2022.01) |
| *G06V 10/44* | (2022.01) |

(52) U.S. Cl.
CPC .............. *G06T 7/0002* (2013.01); *G06T 7/73* (2017.01); *G06V 10/25* (2022.01); *G06V 10/454* (2022.01); *G06V 10/82* (2022.01); *G06V 10/84* (2022.01); *G06V 30/19173* (2022.01); *G06T 2207/20016* (2013.01); *G06T 2207/20072* (2013.01); *G06T 2207/20076* (2013.01); *G06T 2207/20084* (2013.01); *G06T 2207/30168* (2013.01)

(58) Field of Classification Search
CPC .................... G06T 7/0002; G06T 7/73; G06T 2207/20016; G06T 2207/20072; G06T 2207/20076; G06T 2207/20084; G06T 2207/30168; G06V 10/25; G06V 10/454; G06V 10/82; G06V 10/84; G06V 30/19173; G06V 10/242; G06V 10/267; G06V 20/62; G06V 30/153
See application file for complete search history.

(56) References Cited

U.S. PATENT DOCUMENTS

| | | | | |
|---|---|---|---|---|
| 2008/0123945 | A1* | 5/2008 | Andrew | G06V 30/162 382/164 |
| 2008/0310721 | A1* | 12/2008 | Yang | G06V 30/162 382/182 |
| 2010/0033765 | A1* | 2/2010 | Fan | H04N 1/40062 358/449 |
| 2013/0335442 | A1 | 12/2013 | Fleck et al. | |
| 2014/0071343 | A1* | 3/2014 | Mizuno | H04N 21/4884 348/468 |
| 2015/0200998 | A1* | 7/2015 | Gu | H04L 67/131 709/208 |
| 2018/0174046 | A1* | 6/2018 | Xiao | G06F 18/253 |
| 2019/0139193 | A1 | 5/2019 | Navarrete Michelini et al. | |

FOREIGN PATENT DOCUMENTS

| | | |
|---|---|---|
| CN | 106960206 A | 7/2017 |
| CN | 107247950 A | 10/2017 |
| CN | 107391505 A | 11/2017 |
| CN | 107527059 A | 12/2017 |
| CN | 107820096 A | 3/2018 |
| CN | 108171010 A | 6/2018 |
| CN | 108229303 A | 6/2018 |
| CN | 108230329 A | 6/2018 |

OTHER PUBLICATIONS

Peng, C., "Large Kernel Matters—Improve Semantic Segmentation by Global Convolutional Network", Proceedings of the IEEE Conference on Computer Vision and Pattern Recognition (CVPR), 2017, pp. 4353-4361.*
International Search Report dated Oct. 25, 2019 in PCT/CN2019/098414 filed on Jul. 30, 2019, 2 pages.
Extended European Search Report dated Mar. 1, 2022 in European Patent Application No. 19845554.5, 62 pages.
Shouzhi, Huang, et al., "Fully Convolutional Network With Densely Feature Fusion Models for Object Detection" 2018 IEEE International Conference on Multimedia & Expo Workshops (ICMEW), IEEE, XP033453520, Jul. 23, 2018, pp. 1-6.
Duc My Vo, et al., "Semantic Image Segmentation Using Fully Convolutional Neural Networks with Multi-Scale Images and Multi-Scale Dilated Convolutions", Multimedia Tools and Applications. Kluwer Academic Publishers, Boston, US, vol. 77, No. 14, XP036554870, Feb. 22, 2018, pp. 18689-18707.
Office Action dted Apr. 4, 2023, issued in corresponding Chinese patent application No. 20181086194.7.

* cited by examiner

| layer name | output size | 18 layers | 34 layers | 50 layers | 101 layers | 152 layers |
|---|---|---|---|---|---|---|
| first layer | 112×112 | 7×7, 64, step size of 2 | | | | |
| second layer | 56×56 | max-pool of 3×3, step size of 2 | | | | |
| | | $\begin{bmatrix} 3\times3, 64 \\ 3\times3, 64 \end{bmatrix} \times 2$ | $\begin{bmatrix} 3\times3, 64 \\ 3\times3, 64 \end{bmatrix} \times 3$ | $\begin{bmatrix} 1\times1, 64 \\ 3\times3, 64 \\ 1\times1, 256 \end{bmatrix} \times 3$ | $\begin{bmatrix} 1\times1, 64 \\ 3\times3, 64 \\ 1\times1, 256 \end{bmatrix} \times 3$ | $\begin{bmatrix} 1\times1, 64 \\ 3\times3, 64 \\ 1\times1, 256 \end{bmatrix} \times 3$ |
| third layer | 28×28 | $\begin{bmatrix} 3\times3, 128 \\ 3\times3, 128 \end{bmatrix} \times 2$ | $\begin{bmatrix} 3\times3, 128 \\ 3\times3, 128 \end{bmatrix} \times 4$ | $\begin{bmatrix} 1\times1, 128 \\ 3\times3, 128 \\ 1\times1, 512 \end{bmatrix} \times 4$ | $\begin{bmatrix} 1\times1, 128 \\ 3\times3, 128 \\ 1\times1, 512 \end{bmatrix} \times 4$ | $\begin{bmatrix} 1\times1, 128 \\ 3\times3, 128 \\ 1\times1, 512 \end{bmatrix} \times 8$ |
| fourth layer | 14×14 | $\begin{bmatrix} 3\times3, 256 \\ 3\times3, 256 \end{bmatrix} \times 2$ | $\begin{bmatrix} 3\times3, 256 \\ 3\times3, 256 \end{bmatrix} \times 6$ | $\begin{bmatrix} 1\times1, 256 \\ 3\times3, 256 \\ 1\times1, 1024 \end{bmatrix} \times 6$ | $\begin{bmatrix} 1\times1, 256 \\ 3\times3, 256 \\ 1\times1, 1024 \end{bmatrix} \times 23$ | $\begin{bmatrix} 1\times1, 256 \\ 3\times3, 256 \\ 1\times1, 1024 \end{bmatrix} \times 36$ |
| fifth layer | 7×7 | $\begin{bmatrix} 3\times3, 512 \\ 3\times3, 512 \end{bmatrix} \times 2$ | $\begin{bmatrix} 3\times3, 512 \\ 3\times3, 512 \end{bmatrix} \times 3$ | $\begin{bmatrix} 1\times1, 512 \\ 3\times3, 512 \\ 1\times1, 2048 \end{bmatrix} \times 3$ | $\begin{bmatrix} 1\times1, 512 \\ 3\times3, 512 \\ 1\times1, 2048 \end{bmatrix} \times 3$ | $\begin{bmatrix} 1\times1, 512 \\ 3\times3, 512 \\ 1\times1, 2048 \end{bmatrix} \times 3$ |

Fig. 2

COPY AREA IDENTIFICATION METHOD AND DEVICE

CROSS REFERENCE TO RELATED APPLICATIONS

The present disclosure is a U.S. Bypass Continuation application of International Patent Application No. PCT/CN2019/098414, filed on Jul. 30, 2019, which is based on and claims the priority to the Chinese Patent Application No. 201810861942.7, filed on Aug. 1, 2018, the disclosure of both of which are incorporated herein as a whole into the present application.

TECHNICAL FIELD

This disclosure relates to the technical field of image processing, and particularly to a copy area identification method and device.

BACKGROUND

A large number of commodity advertisements are presented in the form of images inside and outside e-commerce websites every day, and the stock of these advertising images has reached ten billion level with a daily increment of at least several hundred thousand. In order to increase click rates and conversion rates of image advertisements, a platform will make a copy design specification of images, and manually audit them after the images are uploaded by users, which usually costs a large amount of time and manpower.

SUMMARY

According to some embodiments of the present disclosure, there is provided a copy area identification method, comprising: extracting feature information of multiple layers from an image to be processed; encoding the feature of the multiple layers information respectively, and jointly decoding according to encoded information of the multiple layers to acquire a jointly decoded output; acquiring information of pixels according to the jointly decoded output, wherein the information of the pixels comprises rotation angle information of the copy area, and a distance between each of the pixels and a border of the copy area; and determining a position of a border of the copy area according to the information of the pixels.

In some embodiments, that acquiring pixel information according to the jointly decoded output comprises: acquiring the information of the pixels according to the jointly decoded output comprises: fusing the jointly decoded output of each of the pixels with at least one of the jointly decoded outputs of a previous pixel or a next pixel to acquire fused decoded information; and acquiring the information of the pixels according to output of the fused decoded information In some embodiments, the feature information of the multiple layers is extracted by a Convolutional Neural Network (CNN).

In some embodiments, encoding the feature information extracted respectively comprises: inputting the feature information into a Graph Convolutional Network (GCN) respectively to acquire the encoded information of each layer of the multiple layers.

In some embodiments, the GCN convolves each feature by a 1*k convolution kernel and then by a k*1 convolution kernel to acquire a first code, wherein k is a preset constant; convolves each of the feature by a k*1 convolution kernel and then by a 1*k convolution kernel to acquire a second code; and sums the first code and the second code, convolves the summed result with a convolution kernel and outputs a convolved result, to acquire the encoded information.

In some embodiments, jointly decoding according to the encoded information of the multiple layers comprises: decoding the highest layer of the feature information to acquire a highest layer decoded output; and in a sequence of layers from high to low, jointly decoding by using a decoded output of a upper layer and an encoded information of a current layer, and outputting a jointly decoded result to a next layer until the current layer is the lowest layer, then outputting the jointly decoded output.

In some embodiments, jointly decoding by using the decoded output of the upper layer and the encoded information of the current layer comprises: upsampling the encoded information of the current layer to double the amount of the encoded information, then stacking an upsampled result with the decoded output of the upper layer, and then outputting a convolved result after convolving the stacked information with a convolve kernel.

In some embodiments, acquiring the information of the pixels according to the fused decoded information comprises: acquiring the rotation angle information of the copy area, and the distance between each of the pixels and the border of the copy area in four directions by convolving the fused decoded information by a depth of 5; and determining the copy area according to the information of the pixels comprises: determining the position of the border of the copy area by a non-maximum suppression algorithm according to the rotation angle information of the copy area, and the distance between each of the pixels and the border of the copy in the four directions.

In some embodiments, acquiring the information of the pixels according to the fused decoded information further comprises: convolving the fused decoded information by a depth of 1 to acquire a probability that each of the pixels is located in the copy area; and determining the copy area according to the information of the pixels further comprises: selecting pixels which probabilities are greater than or equal to a preset threshold, according to the probability that each pixel is located in the copy area; and determining the position of the border of the copy area by a non-maximum suppression algorithm is: determining the position of the border of the copy area by the non-maximum suppression algorithm, according to the rotation angle information of the copy area and the distance between the selected pixels and the border of the copy in the four directions.

In some embodiments, the copy area identification method further comprises: auditing the copy area according to a preset copy auditing rule; and rejecting a copy scheme corresponding to the image to be processed under the condition that the copy area does not meet the preset copy auditing rule.

In some embodiments, the preset copy auditing rule comprises at least one of: a font size of the characters on the copy being within a preset range of font sizes; or the copy area not occupying a preset protection area.

According to other embodiments of the present disclosure, there is provided a copy area identification device, comprising: a feature extraction module, configured to extract feature information of multiple layers from an image to be processed; a codec module, configured to encode the feature information of the multiple layers respectively, and jointly decode according to encoded information of the multiple layers to acquire a jointly decoded output; a pixel information acquisition module, configured to acquire information of pixels according to the jointly decoded output, wherein the information of the pixels comprises rotation angle information of the copy area and distances between each of the pixels and borders of the copy area; and an area determination module, configured to determine a position of a border of the copy area according to the information of the pixels.

In some embodiments, the information of the pixels acquisition module comprises: a context information fusion unit, configured to fuse the jointly decoded output of each of the pixels with at least one of the jointly decoded outputs of a previous pixel or a next pixel, to acquire fused decoded information; and a coordinate regression unit, configured to acquire the information of the pixels according to output of the fused decoded information.

In some embodiments, the codec module comprises a Graph Convolutional Network (GCN) unit, configured to acquire the encoded information of each layer of the multiple layers according to the feature information.

In some embodiments, the GCN unit is configured to: the GCN unit is configured to: convolve each feature by a 1*k convolution kernel and then by a k*1 convolution kernel to acquire a first code by, wherein k is a preset constant; convolve each of the feature by a k*1 convolution kernel and then by a 1*k convolution kernel to acquire a second code; and sum the first code and the second code, convolve the summed result with a convolution kernel and output a convolved result, to acquire the encoded information.

In some embodiments, the codec module comprises a decoding unit, configured to: the codec module comprises a decoding unit, configured to: decode the highest layer of the feature information to acquire the highest layer decoded output; and in a sequence of layers from high to low, jointly decode by using a decoded output of a upper layer and an encoded information of a current layer, and output a jointly decoded result to a next layer until the current layer is the lowest layer, then output the jointly decoded output.

In some embodiments, the coordinate regression unit is configured to: acquire the rotation angle information of the copy area, and the distance between each of the pixels and the border of the copy area in four directions by convolving the fused decoded information by a depth of 5; and the area determination module is configured to: determine the position of the border of the copy area by a non-maximum suppression algorithm according to the rotation angle information of the copy area and the distance between each of the pixels and the border of the copy in the four directions.

In some embodiments, the coordinate regression unit is further configured to: convolve the fused decoded information by a depth of 1 to acquire a probability that each of the pixels is located in the copy area; and the area determination module is further configured to: select pixels which probabilities are greater than or equal to a preset threshold according to the probability that each of the pixels is located in the copy area; and determine the border position of the copy area by the non-maximum suppression algorithm, which is: determine the position of the border of the copy area by the non-maximum suppression algorithm, according to the rotation angle information of the copy area, and the distance between the selected pixels and the border of the copy in the four directions.

In some embodiments, the copy area identification device further comprises an auditing unit configured to: audit the copy area according to a preset copy auditing rule; and reject a copy scheme corresponding to the image to be processed under the condition that the copy area does not meet the preset copy auditing rule.

According to still other embodiments of the present disclosure, there is provided a copy area identification device, comprising: a memory; and a processor coupled to the memory, wherein the processor is configured to perform any of the copy area identification methods described above based on instructions stored in the memory.

According to further embodiments of the present disclosure, there is provided a computer-readable storage medium having stored thereon computer program instructions, wherein the instructions, when executed by a processor, implement the steps of any of the copy area identification methods above.

BRIEF DESCRIPTION OF THE DRAWINGS

The accompanying drawings described herein are provided for a further understanding of the present disclosure and constitute a part of this disclosure. The illustrative embodiments of the present disclosure and the descriptions thereof serve to explain but not to improperly limit the present disclosure. In the drawings:

FIG. 2 is a hierarchical structure diagram of a Residual Network (Resnet) in the copy area identification method according to the present disclosure.

DETAILED DESCRIPTION

The technical solutions of the present disclosure are further described in detail with reference to the accompanying drawings and embodiments.

Figure 1A:
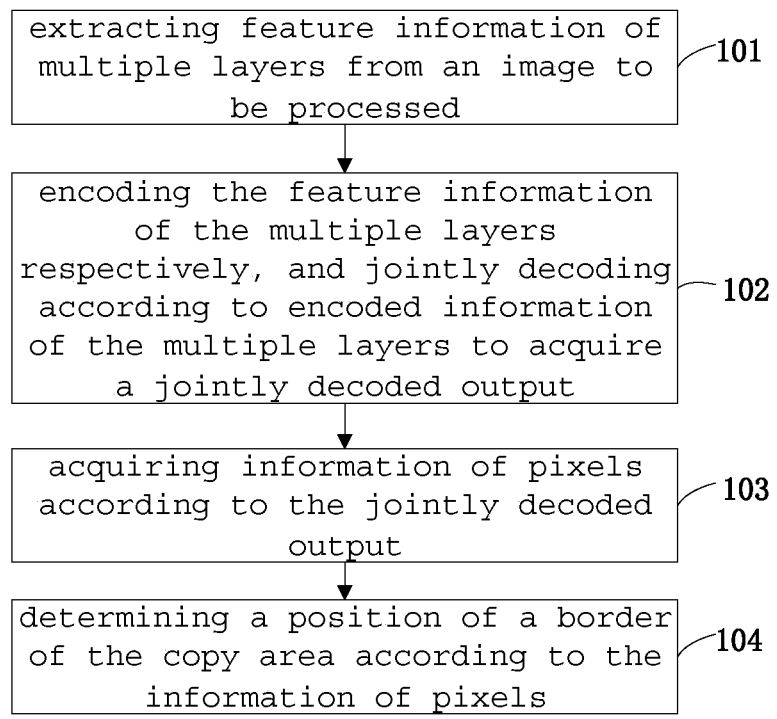
FIG. 1A is a flowchart of a copy area identification method according to an embodiment of the present disclosure.

A flowchart of a copy area identification method according to an embodiment of the present disclosure is shown in FIG. 1A.

Figure 1B:
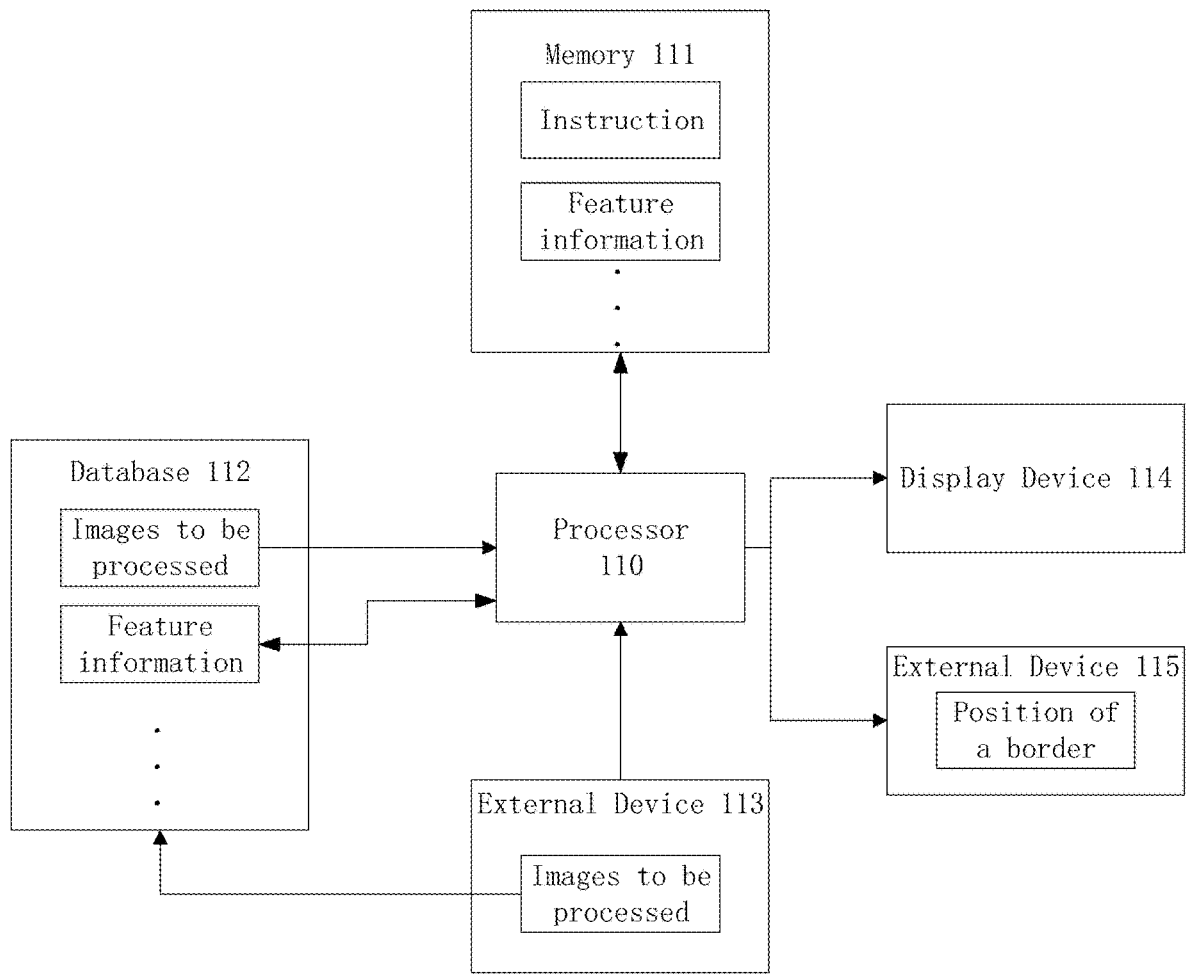
FIG. 1B is a schematic diagram of a device which processes a copy area identification method according to an embodiment of the present disclosure.

In step 101, feature information of multiple layers is extracted from an image to be processed. In some embodiments, as shown in FIG. 1B, images to be processed are stored in a database 112, or in an external devices 113. A processor 110 obtains images to be processed from at least one of database 112 or external device 113. In some embodiments, in order to improve the speed of data obtaining of the processer 110, database 112 obtains images from external devices in advance, and then the processor 110 obtains images from the database 112. In some embodiments, instruction of copy area identification method are stored in the memory. The processor gets the instruction of copy area identification method from memory, and then processes the images according to the instruction.

In step 102, the feature of the multiple layers information is encoded respectively, and a jointly decoded output is acquired by jointly decoding according to encoded information of the multiple layers. In some embodiments, after encoding the feature information of each layer of the multiple layers respectively, the encoding result or decoding result of each layer may be hybrid decoded during the decoding process to acquire the jointly decoded output. In some embodiments, the processor 110 stores the extracted feature information into the database 112 or memory 111. The processor 110 extracts data from the database 112 or memory 111 in real time, and store the intermediate results, such as jointly decoded output and pixel information into the database 112 or memory 111.

In step 103, pixel information of pixels are acquired according to the jointly decoded output, wherein the information of the pixels comprises rotation angle information of the copy area, and a distance between each pixel and a border of the copy area. In some embodiments, the joint decoding is processed by the operation of convolution with a preset depth for acquiring the information of the pixels, and the obtained operation result is regard as the information of the pixels.

In step 104, a position of a border of the copy area is determined according to the information of the pixels. In some embodiments, the position of the border of the copy area may be determined based on a relative position of each pixel to the border of the copy area and a pixel position of each pixel. In some embodiments, the processor outputs the position of the border to a display device 114, or exports it to the database 112 or an external device 115.

In the related art, a copy detection algorithm, such as Efficient and Accurate Scene Text Detector (EAST), has only been tested on some public English data sets to verify the correctness of the algorithm. However, as there are great differences between copies with Chinese and with English in advertising images, this technology cannot be directly used for copy area detection and font size judgment of advertising images with Chinese; as copy forms in the advertising images are complex and diverse, this technology does not consider copies with complex and various Chinese, and particularly, has a poor effect on longer and shorter copies, and thus, cannot accurately detect copy borders, which will influence the accuracy of copy detection and the accuracy of font size judgment.

With the aid of the embodiment described above, feature information of multiple depths can be acquired through feature extraction, and the feature of each depth is considered simultaneously by means of encoding and joint decoding, and then the border position of the copy area is determined by acquiring and analyzing information of the pixels, thus the speed and accuracy of identifying the copy area in an image can be increased.

In some embodiments, the feature information of the multiple layers from the image to be processed can be extracted by a CNN. The CNN is a local connection network and has local connectivity and weight sharing, compared to a full connection network. For a certain pixel in an image, generally, the closer a pixel is to the pixel, the greater the influence on the pixel (local connectivity); in addition, according to statistical features of natural images, a weight of a certain area may also be used on another area (weight sharing). Here, the weight sharing is convolution kernel sharing, and an image feature can be extracted by convolving a convolution kernel with a given image, and a different convolution kernel can extract a different image feature. The feature extraction of the image to be processed is performed by a multilayer CNN, and the deeper the network is, the more abstract the feature expression can be extracted. In some embodiments, a modified Resnet model may be employed as a feature expression of the original input image. A hierarchical schematic diagram of the Resnet model may be shown in FIG. 2. By adopting the CNN to perform the multilayer feature extraction, from shallow to deep, of the image to be processed, it enables to extract multiple features, from concrete to abstract, of the image, to improve the accuracy of the copy area in the image.

Figure 3:
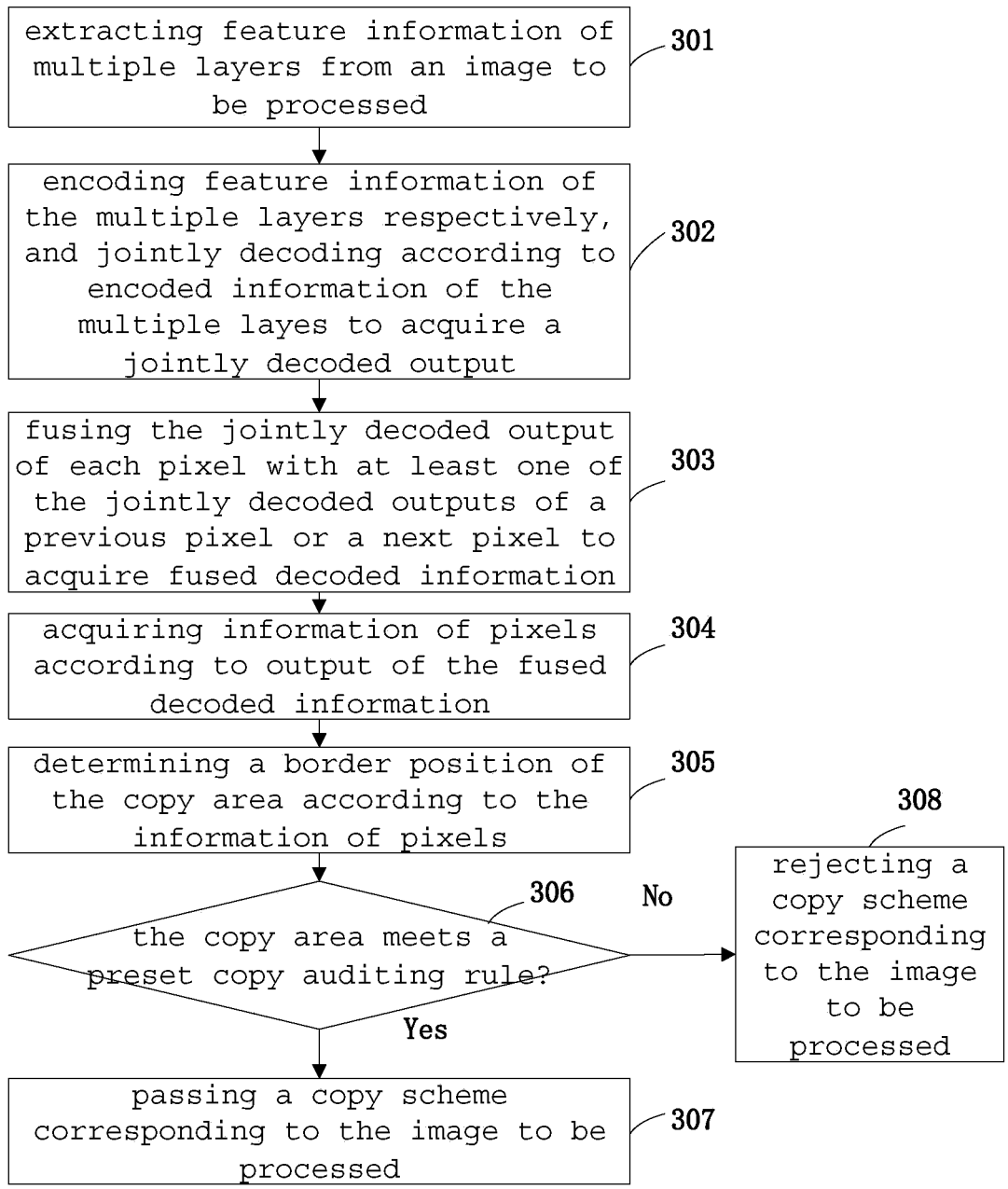
FIG. 3 is a flowchart of a copy area identification method according to another embodiment of the present disclosure.

A flowchart of the copy area identification method according to another embodiment of the present disclosure is shown in FIG. 3.

In step 301, extracting the feature information of the multiply layers is extracted from the image to be processed by a CNN. In some embodiments, in order to achieve both accuracy and operation speed, a Resnet-50 model can be adopted for feature extraction, and except a max-pool layer, layers from the second to the fifth are selected for feature analysis.

In step 302, the feature information is inputted into a GCN respectively to acquire encoded information of each layer of the multiply layers, and then jointly decoding according to the encoded information of the multiply layers outputted by the GCN. In some embodiments, the GCN convolves each feature by a 1*k convolution kernel and then by a k*1 convolution kernel to acquire a first code, wherein k is a preset constant; convolves each feature by a k*1 convolution kernel and then by a 1*k convolution kernel to acquire a second code; and sums the first code and the second code, the summed result with a convolution kernel and outputs a convolved result, to acquire the encoded information. Due to the fact that the GCN has a capacity of expanding a perception field, such a method can improve the detection capacity of longer and shorter copies.

In some embodiments, the jointly decoding process may comprise decoding the highest layer feature to acquire the highest layer decoded output; and in a sequence of layers from high to low, jointly decoding by using a decoded output of a upper layer and encoded information of a current layer, and outputting a jointly decoded result to a next layer until the current layer is a lowest layer, and outputting the jointly decoded result. In some embodiments, that jointly decoding by using the decoded output of the upper layer and the encoded information of the current layer comprises: upsampling the encoded information of the current layer to double the amount of the encoded information, then stacking with the decoded output of the upper layer, and convoluting the stacked result by a 3*3 convolution kernel and outputting a convoluted result. By such a method, the joint decoding of each pixel can have both high-dimensional and low-dimensional features, and feature contents of the joint decoding are enriched, which improves the accuracy of text area determination.

In step 303, jointly decoded output of each pixel is fused with at least one of the jointly decoded outputs of a previous pixel or a next pixel, to acquire fused decoded information; and acquiring pixel information according to output of the fused decoded information. By such a method, the fused decoded information of each pixel can have features of its previous and next pixels, which is favorable to further improve the accuracy of copy area determination.

In step 304, the fused decoded information is convolved by a 3*3 convolution kernel with a depth of 5, to acquire the distance between each pixel and the border of the copy area in four directions, and the rotation angle information of the copy area.

In step 305, the border position of the border of the copy area is determined by a non-maximum suppression algorithm according to the rotation angle information of the copy area and the distance between the pixel and the copy border in the four directions.

In step 306, the copy area is audited according to a preset copy auditing rule. Under the condition that the copy area meets the preset copy auditing rule, the flow goes to step 307; otherwise, the flow goes to step 308.

In some embodiments, the preset copy auditing rule may comprise a requirement that a font size of the characters on the copy is within a preset range of font sizes. The font size of the characters on the copy corresponds to a height or width of a copy (if the copy is arranged horizontally, the font size corresponds to the height of the copy; and if the copy is arranged longitudinally, the font size corresponds to the width of the copy). the font size can be determined by the height or width of the copy, and then, compared with a preset interval of copy font sizes; if the copy font size is not within the preset interval of copy font sizes, the font size of the characters on the copy does not meet the requirement.

By such a method, the font size of the characters on the copy can be ensured to be within the preset range, which avoids reading difficulty caused by too small font sizes, or bad influence on attractiveness caused by too large font sizes, thus optimizes display effect.

In some other embodiments, the preset copy auditing rule may comprise a requirement that the copy area does not occupy a preset protection area, such as an area where an article is displayed in an image, or an area that cannot be occupied according to design and aesthetic requirements; by matching coordinates of the border of the copy area with those of the preset protection area, it is ensured that the copy area does not occupy the preset protection area, to avoid important image information loss caused by copy shielding.

Step 307, determining that a copy scheme corresponding to the image to be processed is passed.

Step 308, rejecting the copy scheme corresponding to the image to be processed.

By such a method, the GCN and the recurrent neural network can be added to perform fusion of long text information and refinement of short text information, and thus, the detection accuracy of long and short copy areas in advertising images is improved, auditing manpower is reduced, and the efficiency is increased.

Figure 4:
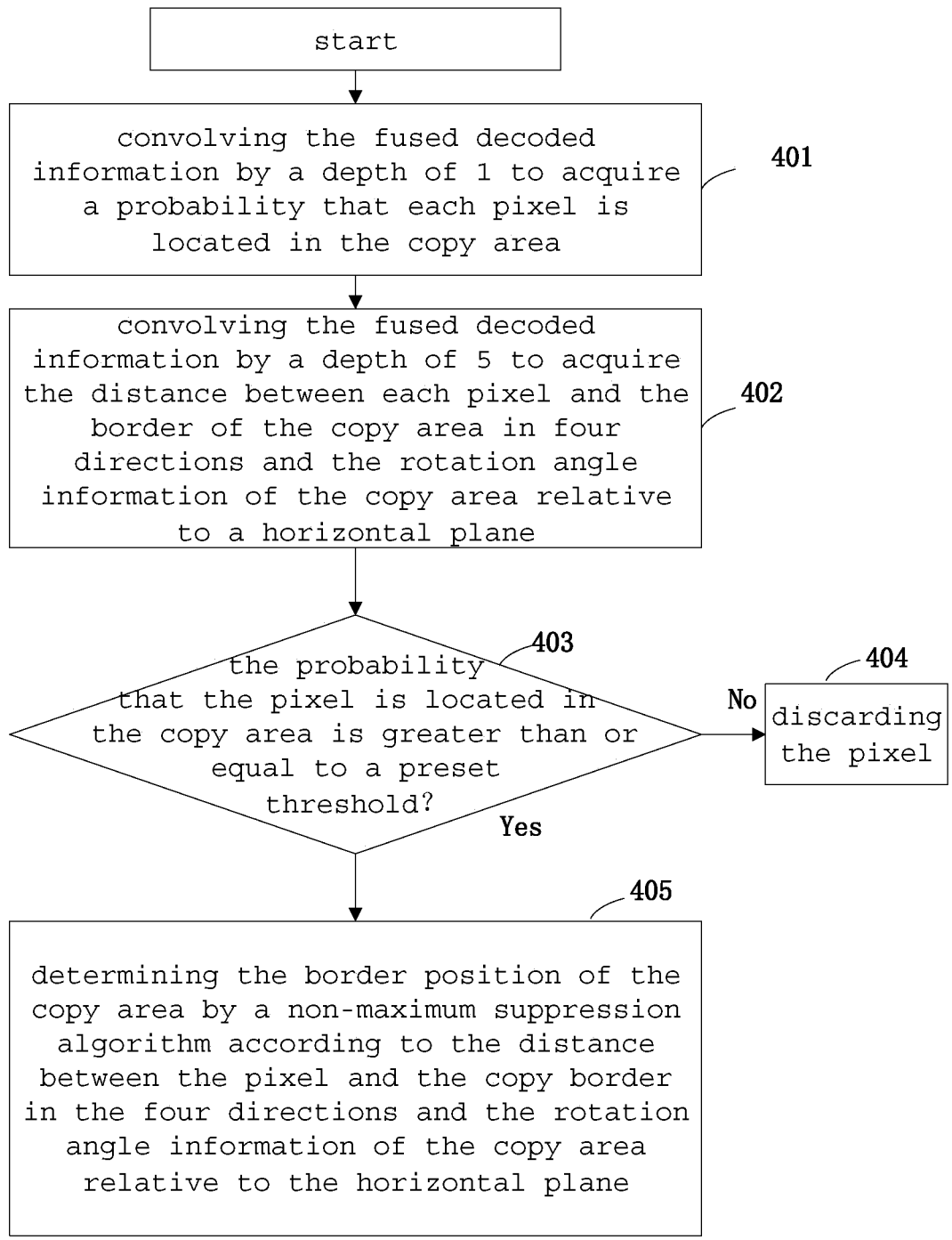
FIG. 4 shows acquiring pixel information and acquiring a border position of the copy area in the copy area identification method according to an embodiment of the present disclosure.

FIG. 4 shows acquiring pixel information and acquiring a border position of the copy area in the copy area identification method according to an embodiment of the present disclosure.

In step 401, convolving the fused decoded information by a 3*3 convolution kernel with a depth of 1, wherein a result (between 0 and 1) is taken as a probability that a pixel is located in the copy area.

In step 402, convolving the fused decoded information by a 3*3 convolution kernel with a depth of 5 to acquire the rotation angle information of the copy area, and the distance between each pixel and the border of the copy area in four directions.

In step 403, comparing the probability with a preset threshold (e.g., 0.8) according to the probability that the pixel is located in the copy area. If the probability that the pixel is located in the copy area is greater than or equal to the preset threshold, the flow goes to step 405; otherwise, the flow goes to step 404.

Step 404, discarding pixels whose probability of being located in the copy area is lower than the preset threshold.

Step 405, determining the border position of the copy area by a non-maximum suppression algorithm according to the rotation angle information of the copy area, and the distance between the pixel and the copy border in the four directions, which improves operation efficiency.

By such a method, pixels determined not to belong to the copy area can be filtered away, and then pixels selected are further processed to obtain the border of the copy area, which reduces operation amount and improves processing efficiency.

Figure 5:
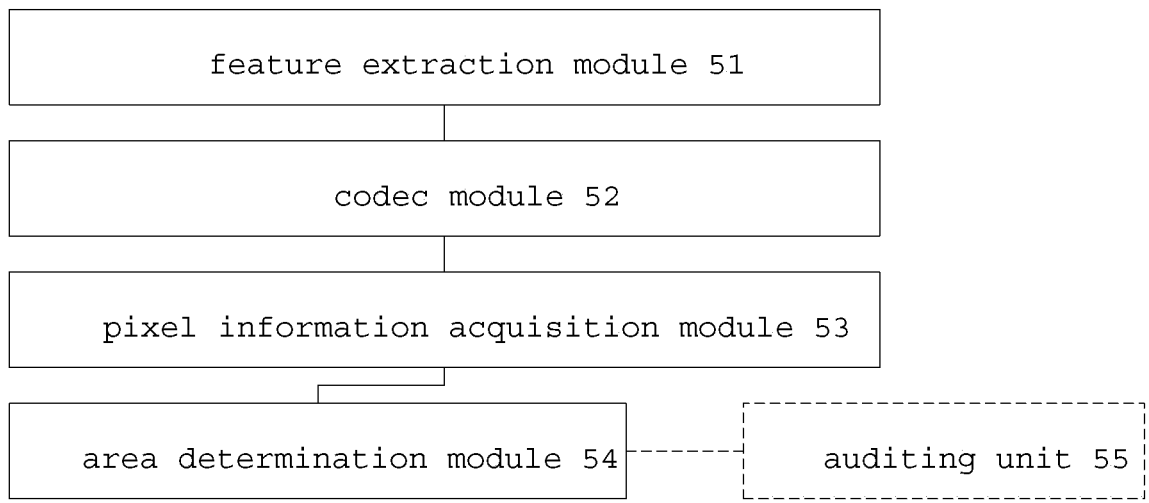
FIG. 5 is a schematic diagram of a copy area identification device according to an embodiment of the present disclosure.

A schematic diagram of a copy area identification device according to an embodiment of the present disclosure is shown in FIG. 5.

A feature extraction module 51 can extract feature information of multiple layers from an image to be processed. In some embodiments, the feature extraction module 51 may be a CNN that extracts multiple features, from concrete to abstract, of the image, to improve the accuracy of the copy area in the image.

A codec module 52 can encode the feature information of the multiply layers respectively, and jointly decode according to encoded information of the multiple layers to acquire a jointly decoded output. In some embodiments, after encoding the feature information of each layer of the multiple layers respectively, the encoding result or decoding result of each layer may be hybrid decoded during the decoding process to acquire the jointly decoded output.

A pixel information acquisition module 53 can acquire information of pixels according to the jointly decoded output, wherein the information of pixels comprises rotation angle information of the copy area, and a distance between each pixel and a border of the copy area and.

An area determination module 54 can determine a border position of the border of the copy area according to the information of the pixels. In some embodiments, the position of the border of the copy area may be determined based on a relative position of each pixel to the border of the copy area and a pixel position of each pixel.

Such a device can acquire feature information of multiple depths by feature extraction, and consider the feature of each depth simultaneously by means of encoding and joint decoding, and then determine the border position of the copy area by acquiring and analyzing information of the pixels, thus the speed and accuracy of identifying the copy area in an image can be increased.

In some embodiments, the copy area identification device may further comprise an auditing unit 55, capable of auditing the copy area according to a preset copy auditing rule. Under the condition that the copy area meets the preset copy auditing rule, a copy scheme corresponding to the image to be processed is determined to pass; under the condition that the copy area does not meet the preset copy auditing rule, the copy scheme corresponding to the image to be processed is rejected.

Such a device can audit the copy area according to the preset copy auditing rule then output an auditing result, which avoids manual operations and improves execution efficiency.

Figure 6:
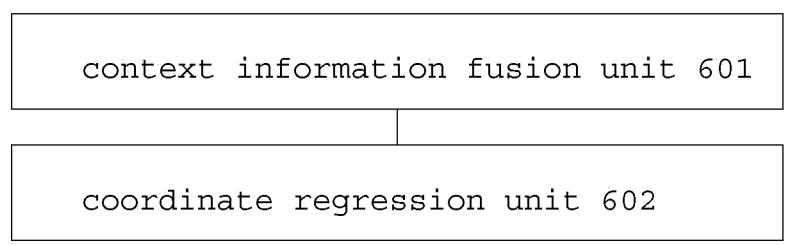
FIG. 6 is a schematic diagram of a pixel information acquisition module in the copy area identification device according to an embodiment of the present disclosure.

A schematic diagram of the pixel information acquisition module in the copy area identification device according to an embodiment of the present disclosure is shown in FIG. 6. The pixel information acquisition module comprise a context information fusion unit 601 and a coordinate regression unit 602.

The context information fusion unit 601 is capable of fusing the jointly decoded output of each pixel with at least one of the jointly decoded outputs of a previous or next pixel, to acquire fused decoded information. The coordinate regression unit 602 is capable of acquiring pixel information according to output of the fused decoded information. By using such a device to process the image, the fused decoded information of each pixel can have the features of both its previous and next pixels, which is favorable to further improve the accuracy of copy area determination.

Figure 7:
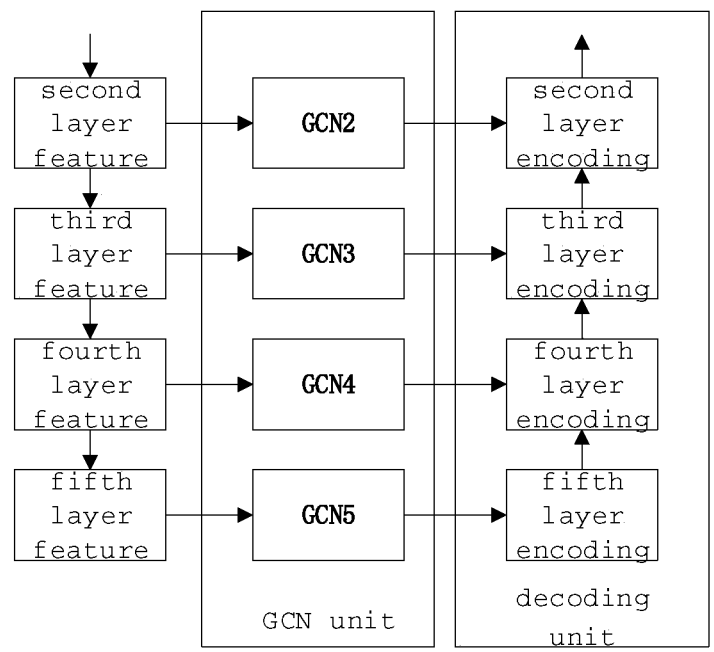
FIG. 7 is a schematic diagram of a codec module in the copy area identification device according to an embodiment of the present disclosure.

A schematic diagram of the codec module in the copy area identification device according to an embodiment of the present disclosure is shown in FIG. 7. The feature information of the multiply layers extracted by the feature extraction module 51, such as features from the second to the fifth layers, are respectively input into the GCNs 2 to 5, and are decoded by decoding units of multiply layers. In some embodiments, the GCN convolves each feature by a 1*k convolution kernel and then by a k*1 convolution kernel to acquire a first code, wherein k is a preset constant; convolves each feature by a k*1 convolution kernel and then by a 1*k convolution kernel to acquire a second code; and then sums the first code and the second code, the summed result with a convolution kernel and outputs a convolved result, to acquire the encoded information.

In some embodiments, as shown in FIG. 7, except the decoding unit for decoding the encoding of the highest layer, any other decoding unit jointly decodes by using the decoded output of a upper layer and encoded information of a current layer and then outputs to the next layer, and the decoding unit of the lowest layer outputs the jointly decoded information. In some embodiments, the decoding unit upsamples the encoded information of the current layer to double the amount of the encoded information, stacks with the decoded output of the upper layer, and convolutes a combined result by a 3*3 convolution kernel and outputs the convoluted result, thereby achieving joint decoding by using the decoded output of the upper layer and the encoded information of the current layer.

Such a device enables the joint decoding of each pixel to have both high-dimensional and low-dimensional features, which enriches feature contents of the joint decoding and improves the accuracy of text area determination.

Figure 8:
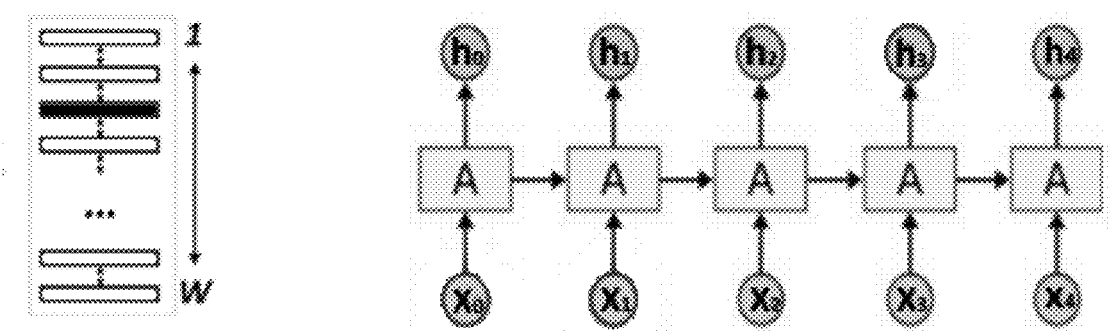
FIG. 8 is a schematic diagram of a context information fusion unit in the copy area identification device according to an embodiment of the present disclosure.

In view of the problem that an accurate border of a long copy cannot be acquired because various propaganda copies in advertising images change greatly and lengths of some copies may exceed the range of a neural network perception field, the context information fusion unit is used for information fusion processing of the outputs of the codec module. A schematic diagram of the context information fusion unit in the copy area identification device according to an embodiment of the present disclosure is shown in FIG. 8, where the left side is a structure diagram of a Bidirectional Long Short-Term Memory (BLSTM) Network, and the right side is a expansion diagram of a one-way LSTM (Long Short-Term Memory) Network. The features with a dimension of C (C represents the number of channels, and C is a positive integer) corresponding to all windows of each row output by the codec module are input into a bidirectional Recurrent Neural Network (RNN) (BLSTM) to obtain a 256-dimensional (the number of hidden layers of RNN) output, and then the feature size is changed back to C through a full connection layer. After processed by the recursive neural network, each pixel not only has high-dimensional and low-dimensional features, but also has the features of its previous and next pixels. Such a device can optimize the accuracy of the acquired border information when processing longer copy information.

Figure 9:
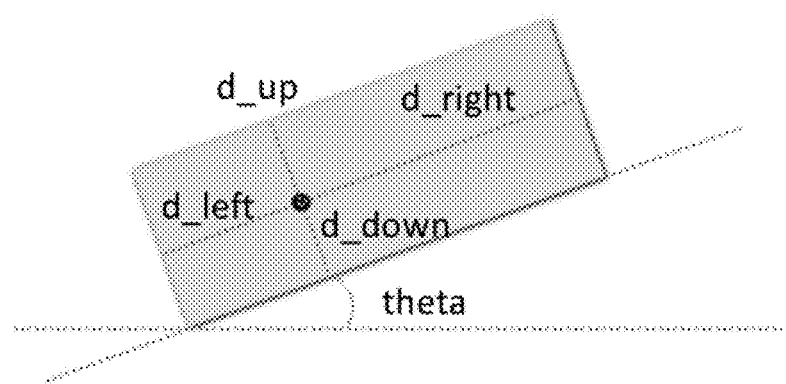
FIG. 9 is a schematic diagram of pixel information acquired by a coordinate regression unit in the copy area identification device according to an embodiment of the present disclosure.

In some embodiments, the coordinate regression unit 602 convolves the output of the context information fusion unit by a 3*3 convolution kernel (with a depth of 1) to obtain first pixel information, and convolves the output of the context information fusion unit by another parallel 3*3 convolution kernel (with a depth of 5) to obtain second pixel information. An amplitude of each point in the first pixel information represents a probability (between 0 and 1) whether the point is located in a text or not. The second pixel information comprises 5 channels, and as shown in FIG. 9, an amplitude of each pixel represents respectively a distance d_left from this pixel to the left side of the border of the copy which this pixel located in, a distance d_right to the right side thereof, a distance d_up to the top thereof, a distance d_down to the bottom thereof, and a rotation angle theta of the border.

The area determination module selects pixels with probabilities greater than or equal to a preset threshold according to the probability that each pixel is located in the copy area; and determines the border position of the copy area by a non-maximum suppression algorithm according to the distance between the selected pixels and the copy border in four directions and the rotation angle information of the copy area.

Such a device can filter away pixels which are determined not to belong to the copy area, and then further processes pixels filtered out to obtain the copy area border, which reduces operation amount and improves processing efficiency.

Figure 10:
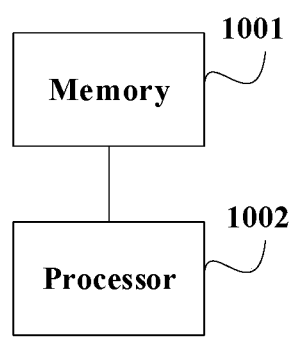
FIG. 10 is a schematic diagram of a copy area identification device according to another embodiment of the present disclosure.

FIG. 10 is a schematic structural diagram of the copy area identification device according to an embodiment of the present disclosure. The copy area identification device comprises a memory 1001 and a processor 1002, wherein: the memory 1001 may be a magnetic disk, flash memory, or any other non-volatile storage medium. The memory is configured to store instructions in the embodiments corresponding to the copy area identification method above. The processor 1002, coupled to the memory 1001, may be implemented as one or more integrated circuits, such as a microprocessor or microcontroller. The processor 1002 is configured to execute the instructions stored in the memory, to increase the speed and accuracy of identifying the copy area in the image.

Figure 11:
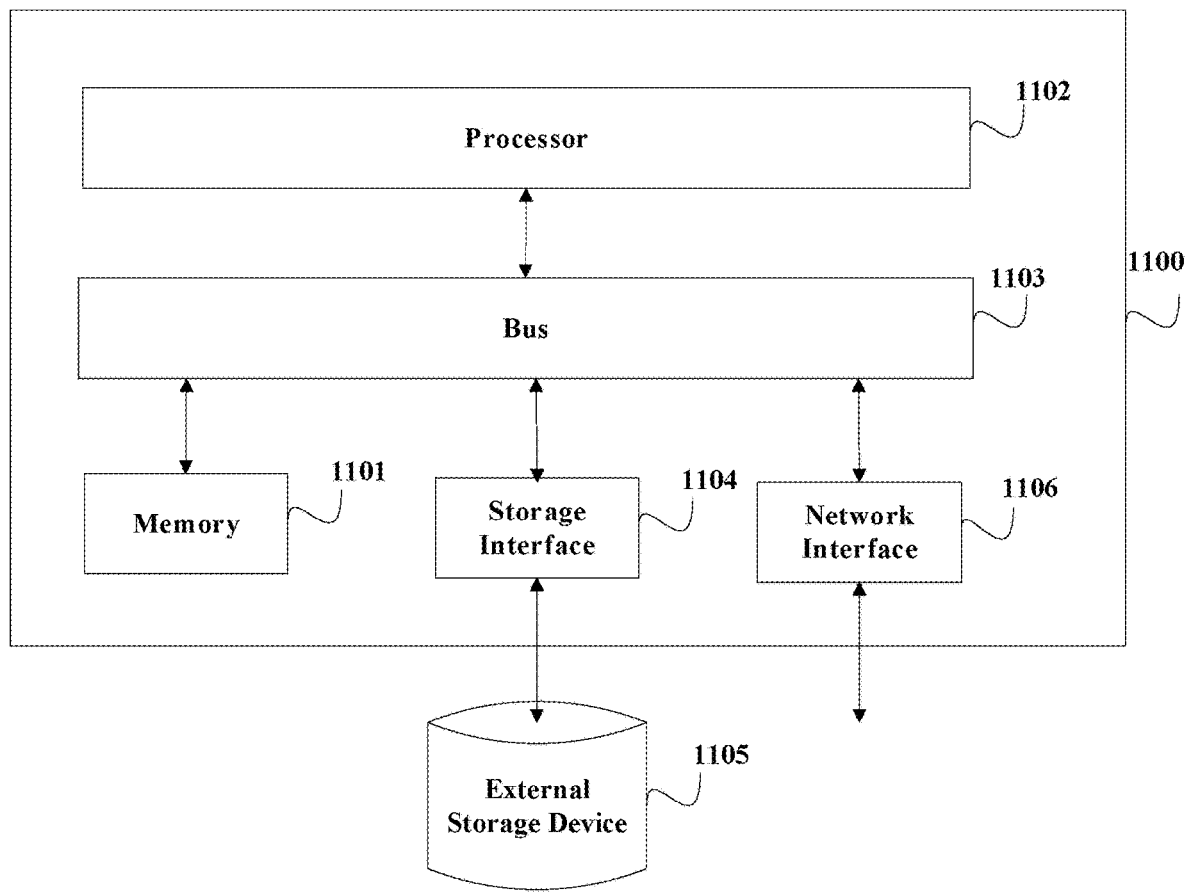
FIG. 11 is a schematic diagram of a copy area identification device according to still another embodiment of the present disclosure.

In some embodiments, a copy area identification device may also be as shown in FIG. 11, and the copy area identification device 1100 comprises a memory 1101 and a processor 1102. The processor 1102 is coupled to the memory 1101 through a BUS 1103. The copy area identification device 1100 may be connected to an external storage device 1105 through a storage interface 1104 to call external data, and also to a network or another computer system (not shown) through a network interface 1106. Detailed descriptions thereof are not repeated herein.

In this embodiment, data instructions are stored in the memory and then processed by the processor, to increase the speed and accuracy of identifying the copy area in the image.

In another embodiment, a computer-readable storage medium has stored thereon computer program instructions which, when executed by a processor, implement the steps of the methods in the embodiments corresponding to the copy area identification method. As will be appreciated by one skilled in the art, the embodiments of the present disclosure may be provided as a method, device, or computer program product. Accordingly, the present disclosure may take the form of an entirely hardware embodiment, an entirely software embodiment or an embodiment combining software and hardware aspects. Furthermore, the present disclosure may take the form of a computer program product embodied on one or more computer-usable non-transitory storage media (including, but not limited to, disk storage, CD-ROM, optical storage, and so forth) having computer-usable program codes embodied therein.

The present disclosure is described with reference to flowcharts and/or block diagrams of methods, apparatus (systems) and computer program products according to the embodiments of the present disclosure. It will be understood that each flow and/or block of the flowcharts and/or block diagrams, and combinations of flows and/or blocks in the flowcharts and/or block diagrams, can be implemented by computer program instructions. These computer program instructions may be provided to a processor of a general purpose computer, special purpose computer, embedded processor, or other programmable data processing apparatus to produce a machine, such that by the instructions executed by the processor of the computer or other programmable data processing apparatus, means for implementing the functions specified in one or more flows of the flowcharts and/or one or more blocks of the block diagrams are created.

These computer program instructions may also be stored in a computer-readable memory that can direct the computer or other programmable data processing apparatus to function in a particular manner, such that the instructions stored in this computer-readable memory produce an article of manufacture comprising instruction means which implement the functions specified in one or more flows of the flowcharts and/or one or more blocks of the block diagrams.

These computer program instructions may also be loaded onto the computer or other programmable data processing apparatus, such that a series of operational steps are performed on the computer or other programmable apparatus to produce a process implemented by the computer, thus the instructions executed on the computer or other programmable apparatus provide the steps for implementing the functions specified in one or more flows of the flowcharts and/or one or more blocks of the block diagrams.

Thus far, the present disclosure has been described in detail. Some details well known in the art have not been described in order to avoid obscuring the concepts of the present disclosure. Those skilled in the art can now fully appreciate how to implement the technical solution disclosed herein, in view of the foregoing description.

The methods and apparatus of the present disclosure may be implemented in a number of ways. For example, the methods and apparatus of the present disclosure may be implemented by software, hardware, firmware, or any combination of software, hardware, and firmware. The above-described order for the steps of the method is for illustration only, and the steps of the method of the present disclosure are not limited to the order specifically described above unless specifically stated otherwise. Further, in some embodiments, the present disclosure may also be embodied as programs recorded in a recording medium, and these programs comprise machine-readable instructions for implementing the methods according to the present disclosure. Thus, the present disclosure also covers a recording medium storing the programs for executing the methods according to the present disclosure.

Finally, it should be noted that: the above embodiments are intended only to illustrate the technical solutions of the present disclosure but not to limit them; although the present disclosure has been described in detail with reference to the preferred embodiments, those of ordinary skill in the art will understand that: modifications to the specific embodiments of the present disclosure or equivalent substitutions for parts of the technical features may be made, all of which are intended to be covered by the scope of the technical solutions as claimed in this disclosure without departing from the spirit thereof.

What is claimed is:

1. A copy area identification method, comprising:
    extracting feature information of multiple layers from an image to be processed;
    encoding the feature of the multiple layers information respectively, and jointly decoding according to encoded information of the multiple layers to acquire a jointly decoded output;
    acquiring information of pixels according to the jointly decoded output, the information of the pixels comprises rotation angle information of the copy area, and a distance between each of the pixels and a border of the copy area, the acquiring the information of the pixels according to the jointly decoded output comprising:
        fusing the jointly decoded output of each of the pixels with at least one of the jointly decoded outputs of a previous pixel or a next pixel to acquire fused decoded information; and
        acquiring the information of the pixels according to output of the fused decoded information, comprising:
            acquiring the rotation angle information of the copy area, and the distance between each of the pixels and the border of the copy area in four directions by convolving the fused decoded information by a depth of 5, and
            convolving the fused decoded information by a depth of 1 to acquire a probability that each of the pixels is located in the copy area; and
    determining a position of the border of the copy area according to the information of the pixels comprising:
        selecting pixels which probabilities are greater than or equal to a preset threshold, according to the probability that each pixel is located in the copy area; and
        determining the position of the border of the copy area by a non-maximum suppression algorithm, according to the rotation angle information of the copy area and the distance between the pixels and the border of the copy in the four directions.

2. The copy area identification method according to claim 1, wherein, the feature information of the multiple layers is extracted by a Convolutional Neural Network (CNN).

3. The copy area identification method according to claim 2, wherein jointly decoding according to the encoded information of the multiple layers comprises:
    decoding the highest layer of the feature information to acquire a highest layer decoded output; and in a sequence of layers from high to low, jointly decoding by using a decoded output of a upper layer and an encoded information of a current layer, and outputting a jointly decoded result to a next layer until the current layer is the lowest layer, then outputting the jointly decoded result.

4. The copy area identification method according to claim 3, wherein jointly decoding by using the decoded output of the upper layer and the encoded information of the current layer comprises:
   upsampling the encoded information of the current layer to double the amount of the encoded information, then stacking an upsampled result with the decoded output of the upper layer, and then outputting a convolved result after convolving the stacked information with a convolve kernel.

5. The copy area identification method according to claim 1, wherein encoding the feature information extracted respectively comprises:
   inputting the feature information into a Graph Convolutional Network (GCN) respectively to acquire the encoded information of each layer of the multiple layers.

6. The copy area identification method according to claim 5, wherein the GCN convolves each feature by a 1*k convolution kernel and then by a k*1 convolution kernel to acquire a first code, wherein k is a preset constant;
   convolves each of the feature by a k*1 convolution kernel and then by a 1 *k convolution kernel to acquire a second code; and
   sums the first code and the second code, convolves the summed result with a convolution kernel and outputs a convolved result, to acquire the encoded information.

7. The copy area identification method according to claim 1, further comprising:
   auditing the copy area according to a preset copy auditing rule; and
   rejecting a copy scheme corresponding to the image to be processed under the condition that the copy area does not meet the preset copy auditing rule.

8. The copy area identification method according to claim 7, wherein the preset copy auditing rule comprises at least one of:
   a font size of characters on the copy being within a preset range of font sizes; or
   the copy area not occupying a preset protection area.

9. A copy area identification device, comprising:
   a memory; and
   a processor coupled to the memory, which, based on instructions stored in the memory, is configured to perform a method comprising:
   extracting feature information of multiple layers from an image to be processed;
   encoding the feature of the multiple layers information respectively, and jointly decoding according to encoded information of the multiple layers to acquire a jointly decoded output;
   acquiring information of pixels according to the jointly decoded output, the information of the pixels comprises rotation angle information of the copy area, and a distance between each of the pixels and a border of the copy area, the acquiring the information of the pixels according to the jointly decoded output, comprising:
   fusing the jointly decoded output of each of the pixels with at least one of the jointly decoded outputs of a previous pixel or a next pixel to acquire fused decoded information; and
   acquiring the information of the pixels according to output of the fused decoded information, comprising:
   acquiring the rotation angle information of the copy area, and the distance between each of the pixels and the border of the copy area in four directions by convolving the fused decoded information by a depth of 5, and
   convolving the fused decoded information by a depth of 1 to acquire a probability that each of the pixels is located in the copy area; and
   determining a position of the border of the copy area according to the information of the pixels, comprising:
   selecting pixels which probabilities are greater than or equal to a preset threshold, according to the probability that each pixel is located in the copy area; and
   determining the position of the border of the copy area by a non-maximum suppression algorithm, according to the rotation angle information of the copy area and the distance between the pixels and the border of the copy in the four directions.

10. The copy area identification device according to claim 9, wherein the feature information of the multiple layers is extracted by a Convolutional Neural Network (CNN).

11. The copy area identification device according to claim 10, wherein jointly decoding according to the encoded information of the multiple layers comprises:
    decoding the highest layer of the feature information to acquire a highest layer decoded output; and
    in a sequence of layers from high to low, jointly decoding by using a decoded output of a upper layer and an encoded information of a current layer, and outputting a jointly decoded result to a next layer until the current layer is the lowest layer, then outputting the jointly decoded result.

12. The copy area identification device according to claim 9, wherein the method further comprising:
    auditing the copy area according to a preset copy auditing rule; and
    rejecting a copy scheme corresponding to the image to be processed under the condition that the copy area does not meet the preset copy auditing rule.

13. A non-transitory computer-readable storage medium storing a computer program that, when being executed by a processor, implement method for performing operations comprising:
    extracting feature information of multiple layers from an image to be processed;
    encoding the feature of the multiple layers information respectively, and jointly decoding according to encoded information of the multiple layers to acquire a jointly decoded output;
    acquiring information of pixels according to the jointly decoded output, the information of the pixels comprises rotation angle information of a copy area, and a distance between each of the pixels and a border of the copy area, the acquiring the information of the pixels according to the jointly decoded output comprising:
    fusing the jointly decoded output of each of the pixels with at least one of the jointly decoded outputs of a previous pixel or a next pixel to acquire fused decoded information; and
    acquiring the information of the pixels according to output of the fused decoded information, comprising:
    acquiring the rotation angle information of the copy area, and the distance between each of the pixels and the border of the copy area in four directions by convolving the fused decoded information by a depth of 5, and convolving the fused decoded information by a depth of 1 to acquire a probability that each of the pixels is located in the copy area; and determining a position of the border of the copy area according to the information of the pixels, comprising:

selecting pixels which probabilities are greater than or equal to a preset threshold, according to the probability that each pixel is located in the copy area; and determining the position of the border of the copy area by a non-maximum suppression algorithm, according to the rotation angle information of the copy area and the distance between the pixels and the border of the copy area in the four directions.

14. The non-transitory computer-readable storage medium according to claim 13, wherein the feature information of the multiple layers is extracted by a Convolutional Neural Network (CNN).

15. The non-transitory computer-readable storage medium according to claim 13, wherein the method further comprising:

auditing the copy area according to a preset copy auditing rule; and rejecting a copy scheme corresponding to the image to be processed under the condition that the copy area does not meet the preset copy auditing rule.

* * * * *